(12) United States Patent
Von Bloh et al.

(10) Patent No.: US 9,275,788 B2
(45) Date of Patent: Mar. 1, 2016

(54) CONTROL TRANSFORMER

(71) Applicants: Jochen Von Bloh, Aachen (DE); Dieter Dohnal, Lappersdorf (DE); Karsten Viereck, Regensberg (DE)

(72) Inventors: Jochen Von Bloh, Aachen (DE); Dieter Dohnal, Lappersdorf (DE); Karsten Viereck, Regensberg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 14/377,314

(22) PCT Filed: Mar. 12, 2013

(86) PCT No.: PCT/EP2013/054925
§ 371 (c)(1),
(2) Date: Aug. 7, 2014

(87) PCT Pub. No.: WO2013/152910
PCT Pub. Date: Oct. 17, 2013

(65) Prior Publication Data
US 2015/0022303 A1    Jan. 22, 2015

(30) Foreign Application Priority Data

Apr. 10, 2012   (DE) .......................... 10 2012 103 048

(51) Int. Cl.
| | |
|---|---|
| H01F 21/02 | (2006.01) |
| H01F 21/12 | (2006.01) |
| H01F 30/12 | (2006.01) |
| H01F 29/02 | (2006.01) |
| H02M 5/12 | (2006.01) |
| H02P 13/06 | (2006.01) |

(52) U.S. Cl.
CPC ................. *H01F 29/02* (2013.01); *H02M 5/12* (2013.01); *H02P 13/06* (2013.01)

(58) Field of Classification Search
CPC ......... H01F 29/02; H01F 27/42; H01F 29/06; H01F 38/085; B23K 9/1012
USPC .............................. 336/145, 5, 146, 147, 150
See application file for complete search history.

(56) References Cited

U.S. PATENT DOCUMENTS

| | | | | |
|---|---|---|---|---|
| 3,818,402 | A * | 6/1974 | Golaski ................... | H01F 29/02 323/255 |
| 4,130,789 | A * | 12/1978 | Neumann ............... | H01F 29/06 200/11 TC |
| 4,336,488 | A * | 6/1982 | Glavitsch ................ | H02P 13/06 323/215 |
| 4,398,180 | A * | 8/1983 | Rometsch ............ | H03K 17/972 336/110 |
| 6,483,205 | B1 * | 11/2002 | Martin .................. | H02M 3/285 307/38 |
| 6,867,570 | B2 * | 3/2005 | Vithayathil ........... | H02J 3/1828 323/205 |

(Continued)

FOREIGN PATENT DOCUMENTS

| | | |
|---|---|---|
| EP | 0913752 A | 5/1999 |
| WO | 20130249528 A | 9/2013 |

*Primary Examiner* — Mangtin Lian
*Assistant Examiner* — Kazi Hossain
(74) *Attorney, Agent, or Firm* — Andrew Wilford

(57) ABSTRACT

The invention relates to a control transformer that is designed as a phase-shifting transformer, wherein semiconductor switching components are provided for each phase at a regulating winding with several partial windings. According to the invention, an additional connecting line with an additional electronic switching component is provided in each phase wherein each of these connecting lines connects a module of the respective phase with the end of the main winding of the adjacent phase.

4 Claims, 5 Drawing Sheets

(56) References Cited

U.S. PATENT DOCUMENTS

| | | | | |
|---|---|---|---|---|
| 2006/0022783 A1* | 2/2006 | Owen | ............... | H01F 30/12 336/5 |
| 2011/0005910 A1* | 1/2011 | Fujita | ............... | H01H 9/0011 200/5 B |
| 2011/0285371 A1* | 11/2011 | Wallmeier | ............... | H02P 13/06 323/282 |
| 2012/0139576 A1* | 6/2012 | Dreyer | ............... | G01R 31/343 324/764.01 |
| 2012/0249277 A1* | 10/2012 | Kraemer | ............... | H01F 29/04 336/145 |
| 2012/0306471 A1* | 12/2012 | Green | ............... | H01H 9/542 323/355 |
| 2013/0249528 A1* | 9/2013 | Biskoping | ............... | H02P 13/06 323/343 |

\* cited by examiner

Fig. 1 -- Prior art

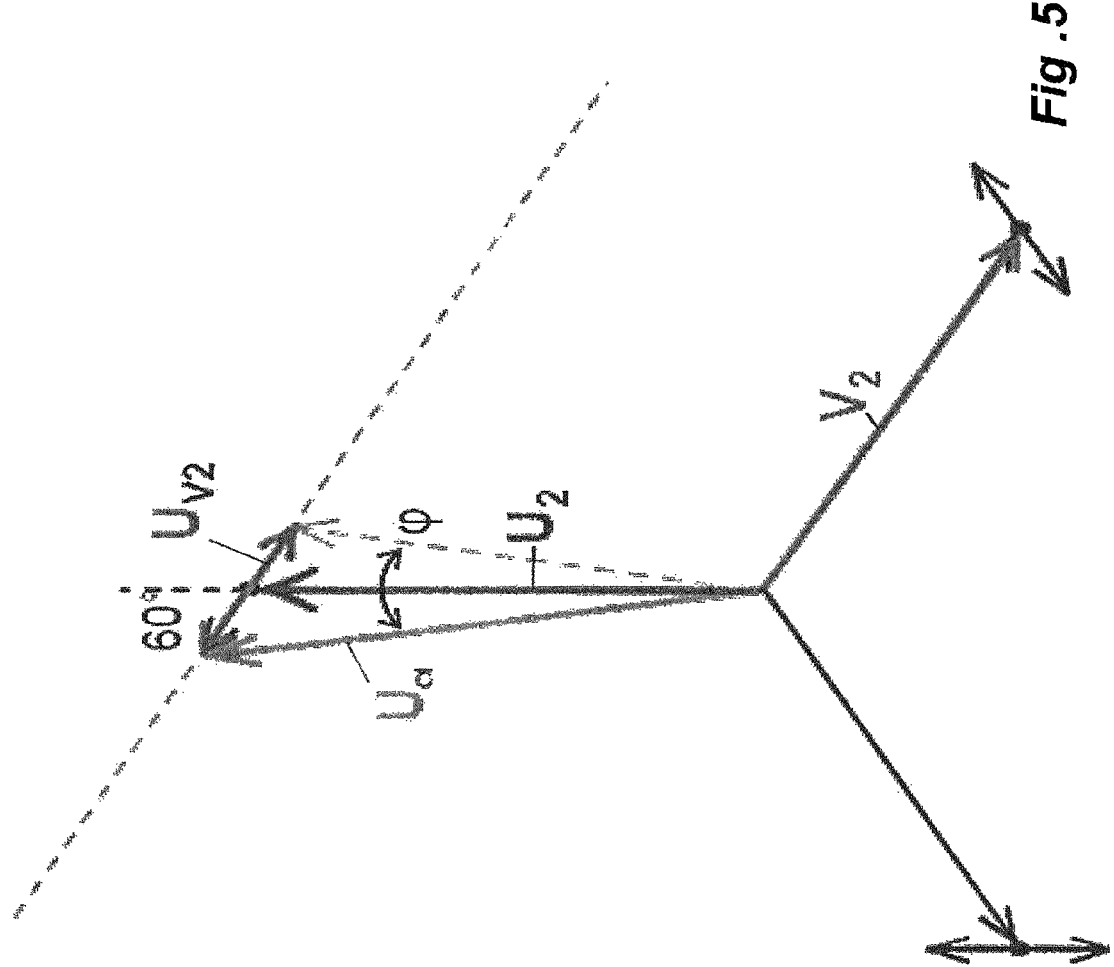

CONTROL TRANSFORMER

CROSS REFERENCE TO RELATED APPLICATIONS

This application is the US-national stage of PCT application PCT/EP2013/054925 filed 12 Mar. 2013 and claiming the priority of German patent application 102012103048.0 itself filed 10 Apr. 2012.

The invention relates to a control transformer and more specifically a phase-shifting transformer.

A phase-shifting transformer, also known as quadrature booster, is a special power transformer that serves for the targeted control of the electric load flow in the field of electric alternating current networks.

In contrast to the common usage of transformers, namely the conversion of alternating voltages to different voltage levels, phase-shifting transformers, as their name suggests, serve for phase shifting in order to exert a targeted influence on the power flow through an electric line. If, for example, several lines are routed along different paths between two switch assemblies or substations, phase-shifting transformers can be a means for influencing how the transmitted power is divided. In a typical application, the existing lines have different transport capacities.

Such a phase-shifting transformer, its construction, and its regulating possibilities are illustrated in detail in the technical book by Krämer: *On-Load Tap-Changers for Power Transformers*, 2000, p. 196 ff.

The presented phase-shifting transformer with high throughput capacity is a two-part transformer comprising a series transformer and a shunt transformer for the actual regulation, via which shunt transformer a specific phase shift can be set by a tap changer. For the commonly employed three-phase alternating current, both a series transformer and a shunt transformer, i.e. a control transformer, are present for each phase.

Via the control transformer a voltage is tapped per phase by the tap changer, the voltage being shifted by 90° with respect to phase voltage to earth and resulting in a phase-shifted voltage via the described series transformer by vector addition.

This type of load manipulation, which is typical of a phase-shifting transformer, is also referred to as quadrature regulation, by contrast to the in-phase regulation of a standard transformer.

In such an instance, the load flow through the phase-shifting transformer can likewise occur in both directions.

The setting range of the phase angle differs depending on the design. It typically lies in the range of ±10° and can amount to 30° in specific embodiments. Different switching variants are possible here, one of which is shown as an example on p. 197 of the above-mentioned technical book.

Besides the 90° quadrature regulation, other methods are also known that are referred to as 60° or 30° phase angle regulation, as the case may be.

The procedure of the 60° phase angle regulation is based on producing the required excitation voltage via a winding part of the adjacent limb of a transformer core and vectorially adding the excitation voltage to the voltage of the main winding. In such an instance, the degree of phase shift can also be adjusted by a tap changer.

Such switching of the windings are commonly performed inside the transformer tank, as a change-over of the transformer operating mode is normally not provided for. Only reconnecting devices are provided, by means of which the switching of the winding can be changed in a voltageless state.

Due to their design, the known control transformers with their internal switching of transformer windings thus only allow defining one certain transformer operating mode, such as the application as a phase shifter, or, in the simplest instance, as the known in-phase regulator for regulating the voltage of a power grid.

The known control transformers do not provide for a changing operating mode, and a change can only be realized with extreme effort during ongoing transformer operation because it is not possible to control the switching components in such a manner that they can perform a change-over of the transformer operating mode at a minimal stress on the switching paths.

The object of the invention, therefore, is to specify a control transformer that enables, in a simple manner and using only few switching components, to convert the operating mode of the same transformer between in-phase regulating operation, i.e. voltage regulation on the one hand side, and phase-shifting operation, i.e. shifting of phase position of input voltage and output voltage on the other hand.

This object is fulfilled by a control transformer with semiconductor switching components having the features of the two coordinate claims. Claim 1 relates to a control transformer with main winding and regulating winding, and claim 2 relates to such a transformer with a coarse step additionally connectable in the same sense or in the opposite sense.

The general inventive idea in both embodiments consists in further developing a control transformer with semiconductor switching components by further electric connecting lines and further semiconductor switching components connecting these further electric connecting lines in such a manner that the transformer can be provided in a simple way for functioning both as an in-phase regulator and as a phase shifter, i.e. a phase angle regulator.

A modular control transformer with semiconductor switching components is in principle already known from the publication by Demirci, Torrey, Degeneff, Schaeffer, Frazer: "A new approach to solid-state on load tap changing transformers", IEEE Transactions on Power Delivery, Vol. 13, No. 3, July 1998. It can be used for in-phase regulating and is explained once more below.

In the following, the invention will be illustrated exemplarily in more detail by a drawing, in which:

FIG. 5 shows a vector diagram of an exemplary control transformer according to the invention according to FIGS. 2 and 4.

FIG. 1 shows a known three-phase transformer, at which regulating is to be carried out and as it has already been proposed, having a low voltage winding 1 and a high voltage winding 2, here with three separate partial windings W1 . . . W3, to which a modular tap changer is switched that here comprises three individual modules M1, M2, M3.

All phases are constructed identically.

The first module M1 comprises the first partial winding W1 and on both sides thereof two bypass paths that each comprise a series connection of two semiconductor switching components. Provided between the respective two serially connected switching components is a center tap.

Here and in the following figures, the individual semiconductor switching components are illustrated only schematically as simple switches. In practice, they comprise thyristor pairs, IGHTs, or other semiconductor switching components that are connected in parallel. They can also each comprise a series connection or a parallel connection of a plurality of such individual semiconductor switching components.

One of the center taps is electrically connected with the star point 3. The other center tap is connected with a center tap of a second module M2. This second module M2 is identically constructed, and it also comprises a partial winding W2 and the two series connections, each of two semiconductor switching components. Again, center taps are provided between the respective series connections. The connection of the one center tap with the first module M1 has already been explained above; the second center tap is for its part connected with a center tap of a third module M3.

This third module M3 is, again, identically constructed. It comprises, again, a partial winding W3 and the two series connections of semiconductor switching components as well as the center taps positioned therebetween. The as yet not mentioned center tap of the third and, in this instance, last module M3 is electrically connected with the high voltage winding 2.

The three modules M1 . . . M3 described here differ only in the dimensions of the respective partial windings W1 . . . W3.

The partial winding W2 in the second module M2, for instance, comprises triple the number of turns of the partial winding W1 in the first module M1. The partial winding W3 in the third module M3, for instance, comprises sixfold or also ninefold the number of turns of the partial winding W1 in the first module M1.

This control transformer shown here functions as a customary in-phase regulator for voltage regulation with a total of 21 voltage steps. The individual partial voltages result from the different connections in the same sense, in the opposite sense, or bypass of the individual winding parts W1 . . . W3.

Figure 1:
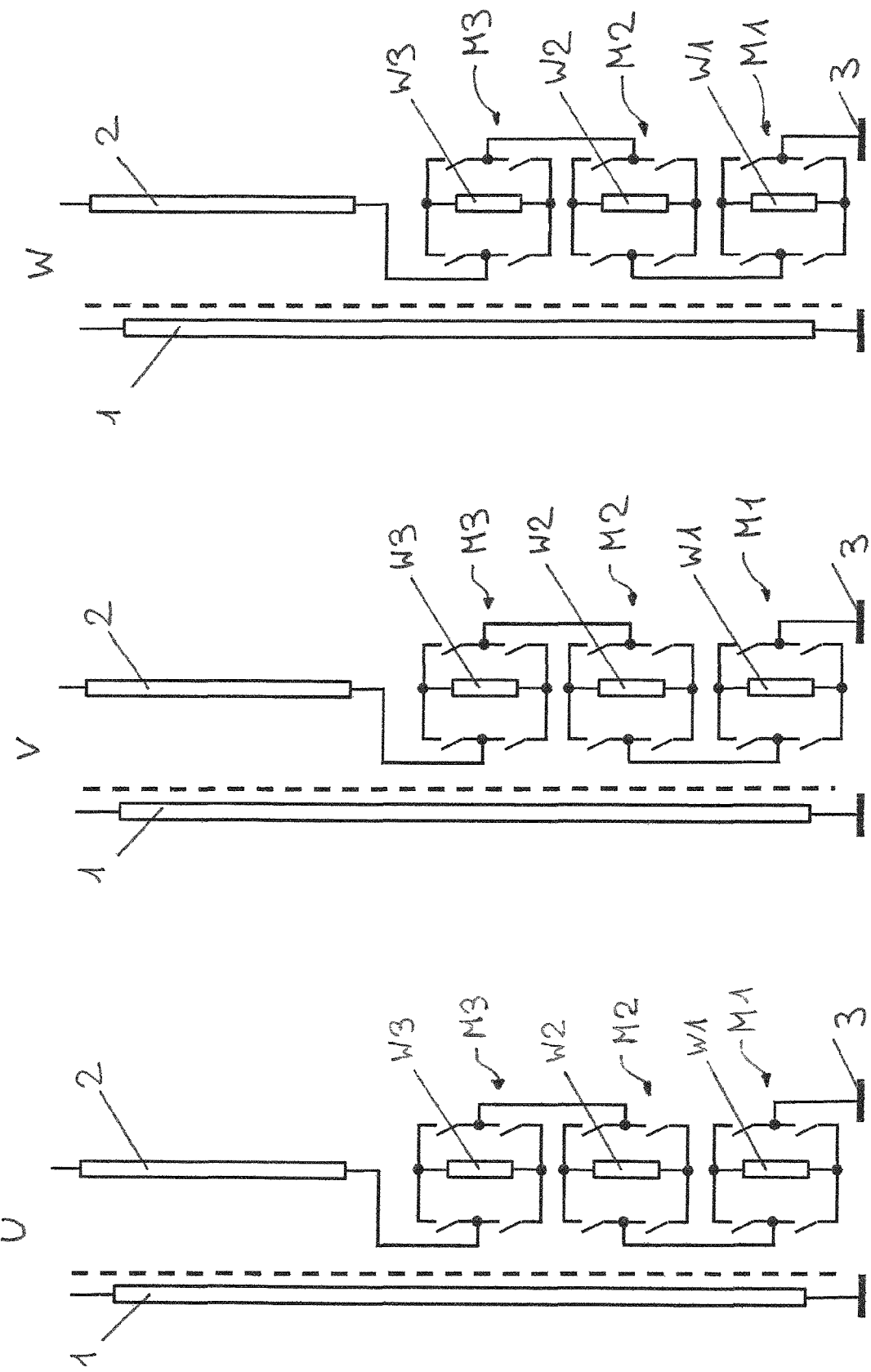
FIG. 1 shows a known control transformer functioning as in-phase regulator.
Figure 2:
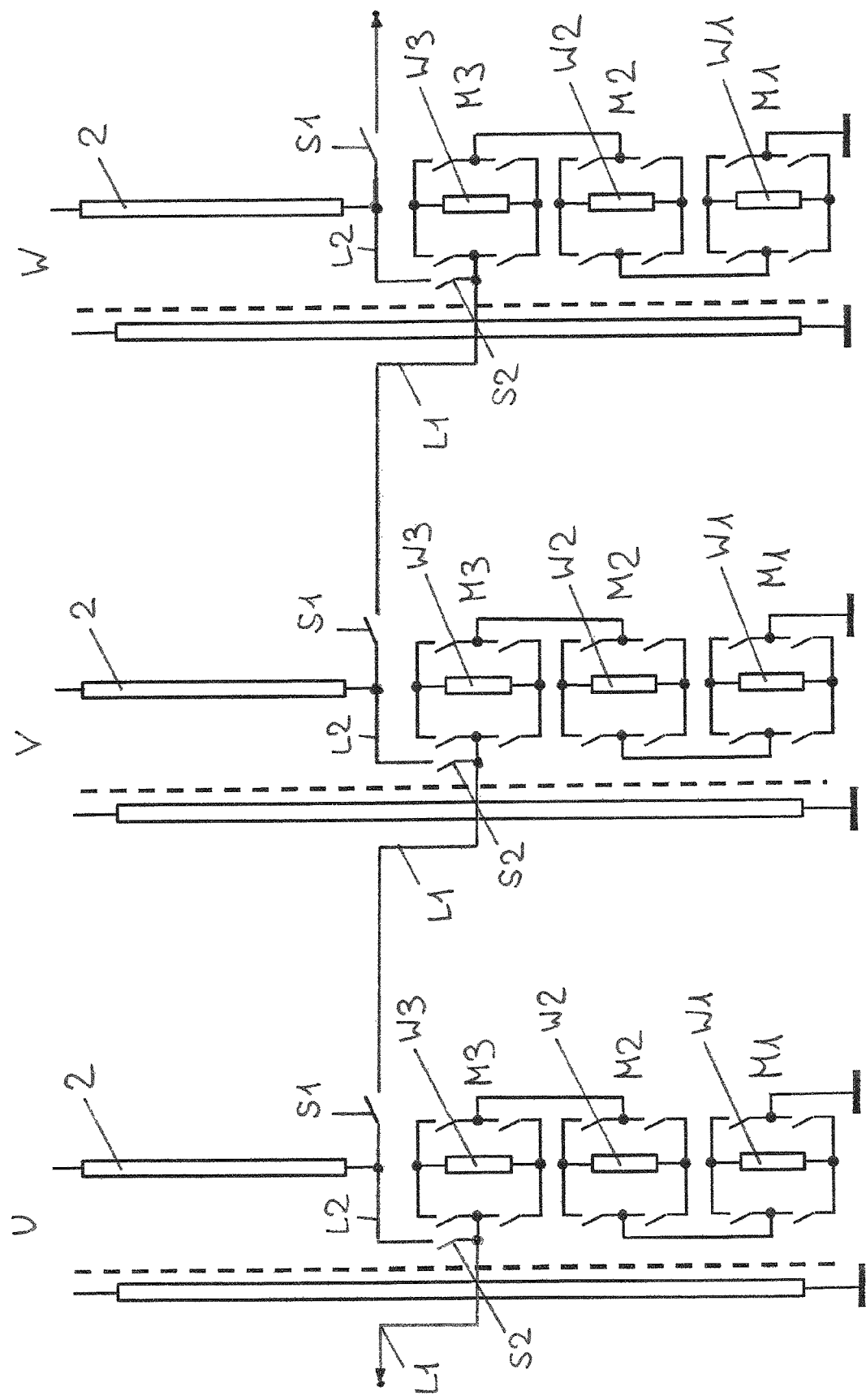
FIG. 2 shows a first control transformer according to the invention as a 60° phase angle regulator, 27 steps.

FIG. 2 shows a first control transformer according to the invention as a 60° phase angle regulator with 27 attainable voltage steps. Respective electric connecting lines L1 and L2 are additionally provided here. An electronic switching component S1 is provided in each of the connecting lines L1. Each of the connecting lines L1 then connects the center tap of module 3 of each phase with the end of the main winding 2 of the respectively adjacent phase. A further connecting line L2, in which a further respective electronic switching component S2 is provided, connects this center tap of the module M3 with the end of the main winding 2 of the respective phase.

The ends of the main windings 2 of all three phases are thus electrically connected with each other by the connecting lines L1 in a quasi "loop connection"; the switching components S1 and S2 of each phase arranged in this "loop connection" create the electric connection according to their switching position—or, alternatively, the electric connection with the respective center tap of the corresponding module M3 of the corresponding phase.

The phase position of the voltage vector that is to be added is predetermined by the adjacent limb, i.e. by the adjacent phase, of the transformer. This results in a phase angle of 60°.

Figure 3:
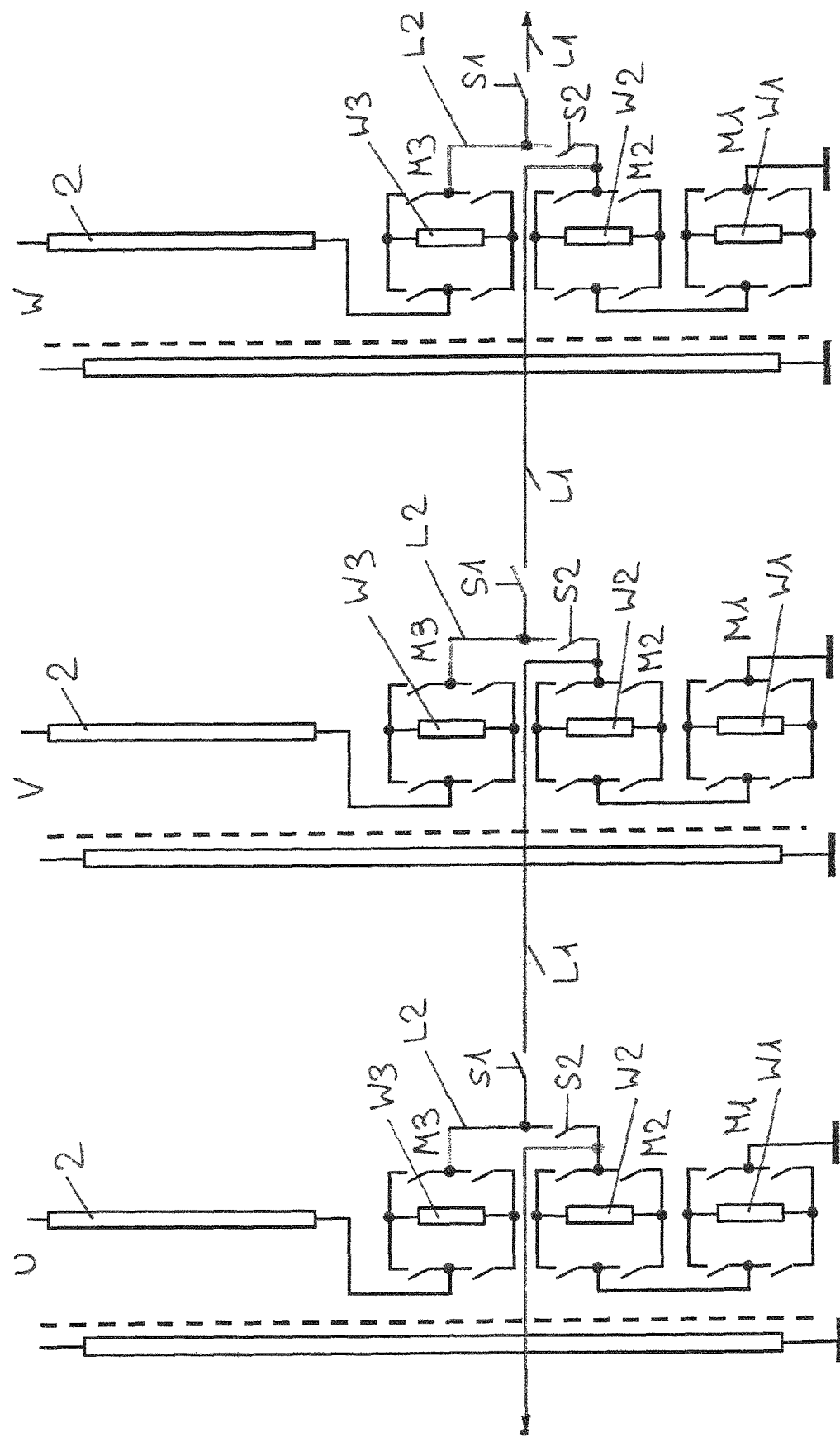
FIG. 3 shows a second control transformer according to the invention as a 60° phase angle regulator with linear coarse step.

FIG. 3 shows a second control transformer according to the invention as a 60° phase angle regulator with linear coarse step. In this instance, the respective partial winding W3 of each phase forms the coarse step that is connectable with the main winding 2 in the same sense or in the opposite sense via the respective module M3. In other words: The module M3 here actuates the coarse step, and it is not involved in the actual voltage regulation that is realized by the modules M2 and M1 in this example. Electric connecting lines L1 and L2 are respectively provided here, too. In analogy to the first illustrated embodiment, an electronic switching component S1 is provided in each of the connecting lines L1. Each of the connecting lines L1 here connects the center tap of module M2 of each phase with the center taps of module M3 of the respective other phases—and not with the respective end of the main winding as described above. The further connecting line L2, in which a further respective electronic switching component S2 is provided here, too, connects this center tap of the module M2 with the center tap of the respective module M3 of the respective phase.

The center taps of the modules M3 of all three phases are thus again electrically connected with each other by the connecting lines L1 in a quasi "loop connection"; the switching components S1 and S2 of each phase arranged in this "loop connection" create the electric connection according to their switching position.

Figure 4:
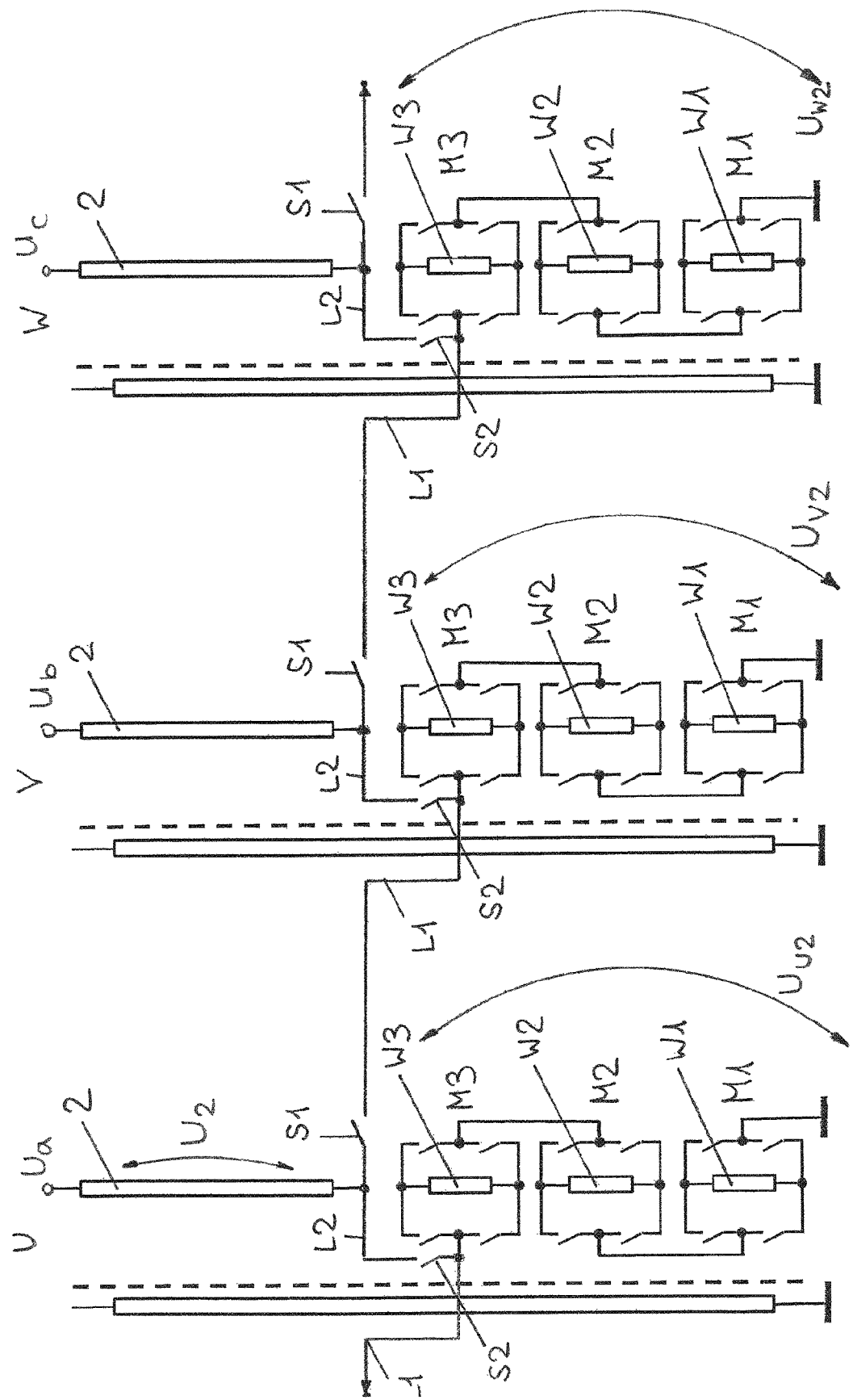
FIG. 4 shows the illustration in FIG. 2, extended by a few reference characters.

In FIG. 4 that in principle illustrates the embodiment is already explained in FIG. 2, reference characters were added for the total voltages $U_a$, $U_b$, and $U_c$ available at the individual phases and for the voltage $U_2$ that drops across the main winding 2, and further for the voltages $U_{u2}$, $U_{v2}$, $U_{w2}$ that each drop across the regulating part that is composed of the corresponding modules M1 . . . M3 in each phase.

FIG. 5 shows a corresponding vector diagram that illustrates the phase shift. The diagram shows the voltage $U_{v2}$ resulting from the regulated voltage from the partial voltages across the partial windings W1, W2, and W3, and further voltage $U_2$ as illustrated in FIG. 4. The result is a phase-shifted voltage $U_a = U_2 + U_{v2}$. In this instance, φ describes the phase shift angle, i.e. the angle by which the phase position of $U_2$ is shifted.

All in all, the presented control transformer with the described topology allows a quick change of the winding conditions in the transformer and thus a quick change of the voltage ratio of the transformer. The detection of the phase position of current and voltage is a precondition here for controlling the semiconductor switches at the right point of time.

The extension according to the invention by the described lines L1 and L2 and the switches S1 and S2 inserted therein in each phase that switches function as quasi toggle switches, and by the use of the information already present in the control of the semiconductor tap switch with regard to the phase position of the currents of the adjacent phase as well, allows performing a change-over of the switching of the windings of main winding and regulating winding during ongoing operation of the control transformer so that change-overs between in-phase regulating operation (voltage regulation) and phase-shifting operation (shift of phase position of input voltage and output voltage) of the same transformer are possible.

The individual semiconductor switching components are illustrated only schematically here as simple switches. In practice, they comprise thyristor pairs, IGBTs, or other semiconductor switching components that are connected in parallel. They can also each comprise a series connection or a parallel connection of a plurality of such individual semiconductor switching components. components or each comprise a series connection or parallel connection of a plurality of such individual semiconductor switching components.

The invention claimed is:

1. A control transformer for voltage regulation with semiconductor switching components having a main winding and a regulating winding with several partial windings for each phase, wherein
   first, second and third modules are provided per phase,
   each module comprises a respective partial winding of the regulating winding and on both sides thereof two bypass paths,
   each bypass path comprises a respective series connection of two semiconductor switching components,
   a respective center tap is provided between each two serially connected switching components of each bypass path,
   the partial windings have different numbers of turns,
   one of the two center taps of each module is connected with a center tap of the adjacent modules,
   the one remaining center tap of the first module is electrically connected with the load dissipation and the one remaining center tap of the third module is electrically connected with the end of the main winding of the control transformer,
   an additional connecting line is provided in each phase and an electronic switching component is inserted into each of the connecting lines
   each of the connecting lines electrically connects the center tap of the third module of the corresponding phase with the end of the main winding of the respective adjacent phase,
   a further connecting line is provided in each phase with a further electronic switching component being inserted into each further connecting line, and
   each of these further connecting lines connects the center tap of the third module with the end of the main winding of the respective own phase.

2. A control transformer for voltage regulation with semiconductor switching components having a main winding of a coarse step winding and a regulating winding with several partial windings for each phase, wherein
   first, second, and third modules are provided per phase,
   the third module comprises the coarse step winding and on both sides thereof two bypass paths,
   the first and second modules comprise a respective partial winding of the regulating winding and on both sides thereof two bypass paths,
   each bypass path comprises a respective series connection of two semiconductor switching components,
   a respective center tap is provided between each two serially connected switching components of each bypass path,
   the partial windings have different numbers of turns,
   one of the two center taps of each module is connected with a center tap of the adjacent modules, and
   the one remaining center tap of the first module is electrically connected with the load dissipation and the one remaining center tap of the third module M3 is electrically connected with the end of the main winding of the control transformer,
   an additional connecting line is provided in each phase and an electronic switching component is inserted into each of the connecting lines,
   each of the connecting lines connects the center tap of the second module of each phase with the center taps of the third module of the respective other phases,
   a further connecting line is provided in each phase with a further electronic switching component being inserted into each further connecting line, and
   the further connecting line connects the center tap of the second module with the center tap of the respective third module of the respective phase.

3. The control transformer according to claim 1, wherein the electronic switching components are each nonparallel-connected thyristor pairs, IGBTs, or other semiconductor switching components or each comprise a series connection or parallel connection of a plurality of such individual semiconductor switching components.

4. The control transformer according to claim 2, wherein the electronic switching components are each nonparallel-connected thyristor pairs, IGBTs, or other semiconductor switching components or each comprise a series connection or parallel connection of a plurality of such individual semiconductor switching components.

* * * * *